Patented July 5, 1927.

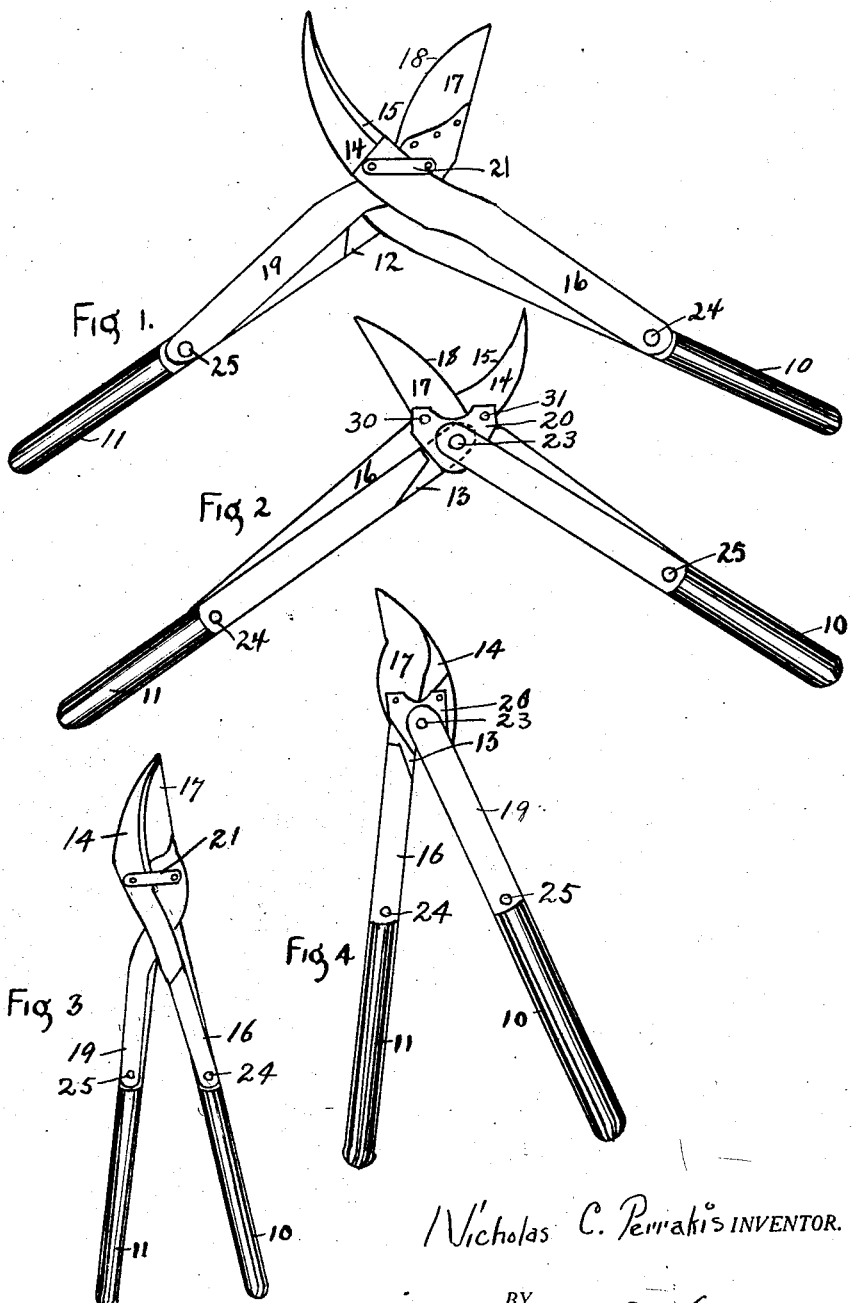

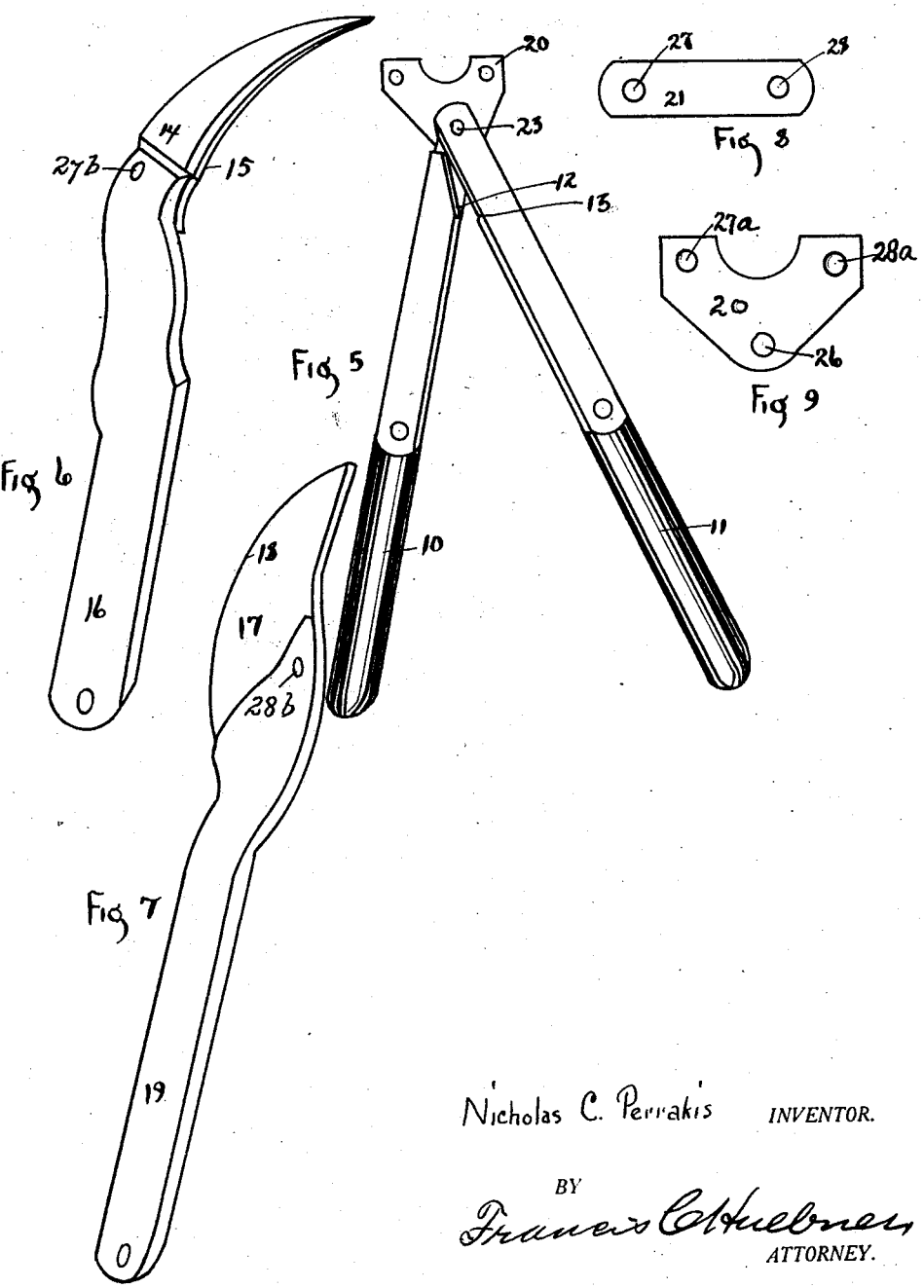

1,634,848

UNITED STATES PATENT OFFICE.

NICHOLAS C. PERRAKIS, OF FRESNO, CALIFORNIA.

PRUNING SHEARS.

Application filed December 20, 1926. Serial No. 156,031.

My invention relates to pruning shears. In fruit growing it is the custom to annually prune the trees and vines, and pruning shears are well known means for accomplishing such work. My invention specifically relates to a form of pruning shears in which a new form of toggle levers are assembled with the shears handles so that the use of the shears requires less effort and strength than is necessary to operate the shears now in common use. The objects I have accomplished are a pruning shears in which the leverage applied to the cutting blade of the shears by manipulating the handles is greatly increased over the ordinary form of lever shears; in which the assembled blades and handles are compact; and in which the blades are easily removable for sharpening or replacement. These and other objects hereinafter disclosed are accomplished by means of the device hereinafter described and illustrated on the accompanying drawing in which Fig. 1 shows a view of the shears complete when opened. Fig. 2 is a reverse view of the shears as shown in Fig. 1. Fig. 3 represents the shears closed, the view being from the same side as shown in Fig. 1. Fig. 4 shows the shears closed, the view being from the side shown in Fig. 2. Fig. 5 illustrates the assembled handles. Fig. 6 is a perspective of the concave blade of the shears. Fig. 7 is a perspective of the convex cutting blade. Fig. 8 shows a strap link and Fig. 9 is a triangular link.

In said drawing the handles 10 and 11 are pivoted together at one end. Shoulders 12 and 13 are formed on the handles to limit the movement of the handles toward each other. The holding blade 14 consists of a rigid concave member which is faced on the one side with a plate 15, cut to conform with the curved shape of the holding blade. Plate 15 is preferably formed of hardened steel which is attached to the base of the holding blade by means of screws countersunk so that the exposed face of the steel plate is on a plane and approximately smooth. A lever extension 16 is attached to the holding blade. The cutting blade of the shears has an outwardly curved sharpened edge 18. The convex outline of the cutting blade conforms approximately to the concave outline of the holding blade.

To the cutting blade is attached a lever 19 of approximately the same length as the lever 16.

Other necessary parts are a triangular link 20 and a strap link 21.

These parts are assembled by pivoting the handles 10 and 11 together at one end, at point 23, then pivot the lever 16 near the end opposite to the blade to the handle 11 between the ends thereof, at point 24, then pivot the lever 19 at the end opposite to the blade to handle 10, between the ends thereof at pivot 25. The two assembled blades and handles are assembled so that the blades cross near the pivot 23 and are pivotally connected with the strap link 21 and the triangular link 20. The triangular link 20 is pivoted in the hole 26 with pivot 23.

The holes 27 and 28 in the strap link are formed to register with the holes 27ª and 28ª in the triangular link. The holes 27ᵇ and 28ᵇ are through the levers 16 and 18 adjacent to the juncture with the blades and the links and levers are assembled by a pivot 30 through holes 27, 27ª and 27ᵇ and a pivot 31 through holes 28, 28ª and 28ᵇ. It will be observed that under the principles of compound levers by the arrangement of levers set forth the power applied to the cutting and holding blades by the operator pressing the handles 11 and 12 together can be greatly enlarged as compared to the ordinary pruning shears in which the assembled blades and handles are pivoted together with one pivot.

Having described my invention I claim:

1. A pruning shears consisting of a concave holding blade and a convex cutting blade each of which is rigidly attached to a lever, said levers being connected together by a link pivotally attached to said lever intermediate of the ends and adjacent to the blades, said blades being assembled so that the cutting blade can pass the holding blade adjacent to a side face of the holding blade; and two handles pivoted together at one end, one of said links connecting the levers being pivoted to the handles at the common point where the handles are pivoted together, said levers being pivoted near the ends opposite to the blades, to the handles intermediate the ends of said handles.

2. A pruning shears consisting of a holding blade and a cutting blade having lever extensions thereto, said lever extensions being pivotally linked together so that by pulling the levers toward each other the cutting and holding edges of the blades will pass each other in close proximity, two handles pivoted together at one end, a link extending from the pivot connecting the two handles to the link connecting the two levers, and pivotal means connecting the levers to the handles.

3. A pruning shears comprising two blades each of which is attached to a lever, link means pivoted to the levers and adapted to hold the blades so that when the levers are drawn together the blades pass each other in a close relation, and when the levers are pulled apart the blades separate, two handles pivoted together and to the link means with a common pivot, and pivotal means for attaching the ends of the levers opposite the blades to the handles intermediate of the ends, substantially as described.

4. A pruning shears consisting of a concave blade and a convex blade, lever extensions on each of said blades, a link having three holes therein positioned so that a line connecting them will describe a triangle, two handles pivoted together at one end, said three holed link being pivoted through one hole to the handles, and through the other two holes to each of the levers adjacent to the blades the ends of the levers opposite the blades being pivoted to the handles.

5. A pruning shears consisting of two handles pivoted together at one end, a lever pivoted at one end to each handle between the ends thereof, said levers being arranged so they cross each other and held in that position by a link pivoted at one end to each lever, and a blade attached to the end of each lever opposite the end pivoted to the handle, the relation between the parts being such that when the handles are moved toward each other the blades pass each other in close proximity.

6. A pruning shears consisting of two blades each of which has a lever extension thereto, said levers being assembled so they cross each other and which are held in that relation by links connecting with and pivoted to the levers, said relation being such that by moving the handles toward each other the blades are simultaneously moved toward each other, two handles pivoted together at one end, one of said links being adapted to be pivoted to the handles at the point where the handles are connected, a line connecting the pivots in said link which connect the link with the handles and the two blades describing a triangle, said lever extensions being pivoted one to each handle at a point between the ends of said handles.

NICHOLAS C. PERRAKIS.